United States Patent [19]

Kinoshita

[11] Patent Number: 4,997,070
[45] Date of Patent: Mar. 5, 1991

[54] RETAINER FOR ONE-WAY CLUTCH

[75] Inventor: Yoshio Kinoshita, Ayase, Kanagawa, Japan

[73] Assignee: NSK-Warner K.K., Tokyo, Japan

[21] Appl. No.: 278,027

[22] Filed: Nov. 30, 1988

[51] Int. Cl.⁵ .................... F16D 11/06; F16D 13/04
[52] U.S. Cl. ............................... 192/41 A; 192/45.1; 188/82.8
[58] Field of Search .................... 192/45.1, 41 A; 188/82.8

[56] References Cited

U.S. PATENT DOCUMENTS

| | | |
|---|---|---|
| 2,366,843 | 1/1945 | Dodge et al. . |
| 2,399,749 | 5/1946 | Lund . |
| 2,404,221 | 7/1946 | Dodge . |
| 2,630,896 | 3/1953 | Dodge . |
| 2,677,449 | 5/1954 | Wavak . |
| 2,731,122 | 1/1956 | Dodge . |
| 2,753,027 | 7/1956 | Troendly et al. . |
| 2,824,635 | 2/1958 | Troendly et al. ............... 192/45.1 |
| 2,832,450 | 4/1958 | Wade . |
| 2,912,086 | 11/1959 | Troendly et al. ............... 192/45.1 |
| 2,940,568 | 6/1960 | Fagiano ............................. 192/45.1 |
| 3,049,206 | 8/1962 | Zlotek . |
| 4,089,395 | 5/1978 | Fogelberg ........................ 192/41 A |
| 4,114,739 | 9/1978 | Colonna et al. ............... 192/45.1 X |
| 4,635,770 | 1/1987 | Shoji et al. . |

FOREIGN PATENT DOCUMENTS

| | | |
|---|---|---|
| 2749271 | 2/1979 | Fed. Rep. of Germany . |
| 3502882 | 8/1985 | Fed. Rep. of Germany . |
| 871537 | 6/1961 | United Kingdom . |

*Primary Examiner*—Dennis L. Taylor
*Assistant Examiner*—J. Russell McBee
*Attorney, Agent, or Firm*—Wegner, Cantor, Mueller & Player

[57] ABSTRACT

In a one-way clutch composed of radially spaced, mutually rotatable and concentrically disposed first and second rotary members, and torque transmitting members arranged between the first and second rotary members to transmit torques therebetween, an annular retainer holding the torque transmitting members at equal angular intervals has such a specific shape that the retainer is resiliently deformable in its entirety against an annular surface of the first or second rotary member so as to maintain at least a part of the retainer in contact with the annular surface of the first or second rotary member.

13 Claims, 6 Drawing Sheets

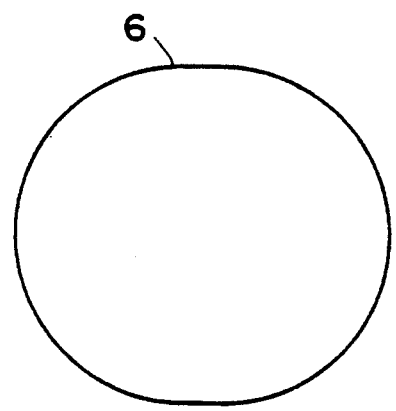
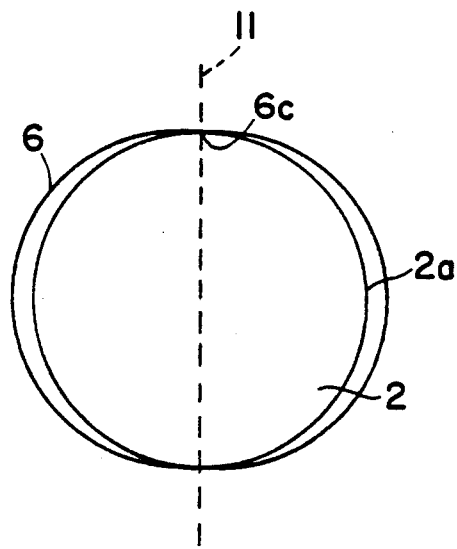

RETAINER FOR ONE-WAY CLUTCH

BACKGROUND OF THE INVENTION (1) Field of the Invention

This invention relates to a one-way clutch, and more specifically to a retainer for a one-way clutch.

(2) Description of the Prior Art

When a one-way clutch (hereinafter abbreviated as "OWC") is incorporated and used in a rotating part of an industrial machine or the like, the OWC has heretofore been retained with a certain degree of drag torque relative to an outer or inner race in order to protect the function of the OWC from vibrations, inertia forces and the like.

When a sudden acceleration or deceleration occurs in the rotation of the outer race by way of example, sprags are caused to slip on the race surface of the outer race due to their inertia forces and frictional forces are developed accordingly. It is hence necessary to apply a frictional force, namely, a drag torque between an outer retainer and the outer race so that the outer retainer and outer race are always rotated as unitary members. This is required to transfer each movement of the outer race promptly to the outer retainer and at the same time to ensure free movements of the sprags. In order to obtain a certain degree of drag torque, the outer retainer has been subjected to cutting machining, namely, T-bar machining or I-bar machining or has been provided with spring members such as drag clips.

Since conventional retainers of the former type are partly cut off, their manufacturing costs are high and in addition, they involve a potential danger that the strength of the retainers themselves is adversely affected. When drag clips or the like are provided as separate members, more parts are required so that their manufacturing costs jump up and their assembly work is also cumbersome. Moreover, the areas of contact between a conventional retainer and the race surfaces of its associated inner and outer races are too small to achieve any stable drag torque.

U.S. Pat. No. 2,630,896 to Dodge discloses a retainer which is, as shown in FIGS. 1e, 4 and 4a, in the form of an oval cage 5" formed with a pair of parallel flanges 5"a, 5"a one at each of opposite circumferential edges of the cage 5" in an attempt to improve the strength of the retainer. However, because of these two flanges 5"a, 5"a, this prior art retainer is too rigid to achieve an adequate degree of resiliency required for a stable drag torque.

SUMMARY OF THE INVENTION

An object of this invention is therefore to provide a retainer, for an OWC, which can obtain a stable drag torque without impairing the strength and resiliency of the retainer.

Another object of the invention is to provide a retainer, for an OWC, which has a simple structure and hence can be manufactured inexpensively.

According to this invention, in a one-way clutch composed of radially spaced, mutually rotatable and concentrically disposed first and second rotary members, and torque transmitting members arranged between the first and second rotary members to transmit torques therebetween, an annular retainer holding the torque transmitting members at equal angular intervals has such a specific shape that the retainer is resiliently deformable in its entirety against an annular surface of the first or second rotary member so as to maintain at least a part of the retainer in contact with the annular surface of the first or second rotary member.

Preferably, the annular retainer is in the form of at least one cylinder having an annular raised portion along the circumferential center line of the cylinder, the annular raised portion projecting from the cylinder so as to define a contact portion contacting the annular surface of the first or second rotary member.

The annular retainer of this invention is in its entirety resiliently deformable relative to the annular surface of the first or second rotary member so as to maintain at least a part of a peripheral surface of the retainer in contact with the annular surface, whereby a certain degree of drag torque can be provided between the retainer and the outer or inner race.

With this arrangement, the following advantageous results can be achieved:

(1) Since no part of the retainer is cut off, the overall strength of the retainer is high. Namely, the retainer assures a prolonged service life.

(2) A stable drag torque can be obtained because the area of contact can be designed large. The retainer can therefore withstand its use under severe conditions such as vibrations, inertia forces and the like.

(3) The retainer does not require cutting machining or attachment of spring members. Its manufacturing cost is therefore low. The retainer can therefore be provided at a low price.

BRIEF DESCRIPTION OF THE DRAWINGS

The above and other objects, features and advantages of this invention will become apparent from the following description and the appended claims, taken in conjunction with the accompanying drawings, in which:

FIG. 1b is a detail view of a circled portion A in FIG. 1a;

FIG. 3 is a fragmentary cross-sectional view of an outer cage of the retainer of FIGS. 1 and 1a;

FIG. 5 is a fragmentary cross-sectional view of the modified outer cage of the modified retainer of FIGS. 2 and 2a.

FIG. 6 is a schematic view showing one example of the shape of a second retainer member;

FIG. 6a is a simplified transverse cross-sectional view showing the second retainer member in contact with an inner race;

Throughout several views of the drawings, like reference numerals designate similar parts or elements serving similar functions.

DETAILED DESCRIPTION OF PREFERRED EMBODIMENTS

Figure 1:
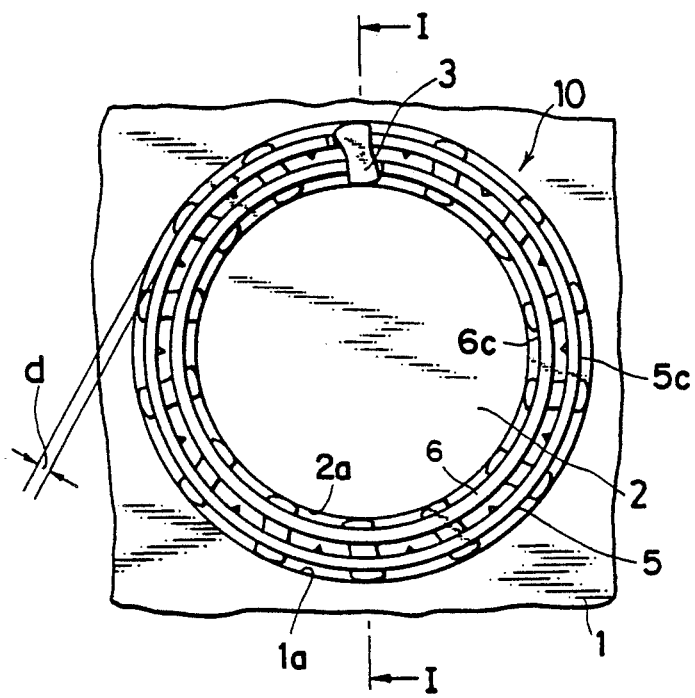
FIG. 1 is a front elevational view of a retainer, for use in an OWC, embodying this invention.
Figure 1A:
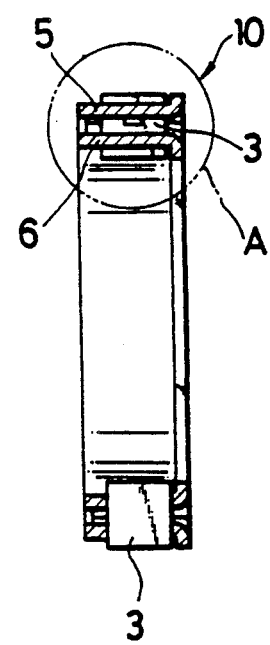
FIG. 1a is a cross-sectional view of FIG. 1 taken in the direction of arrows I.
Figure 1B:
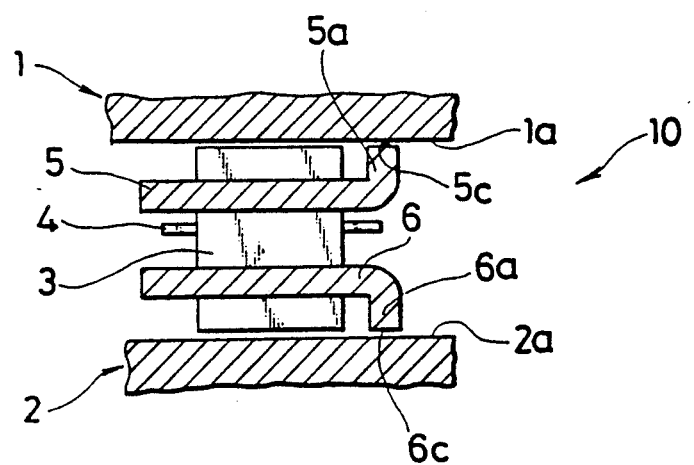

In FIGS. 1, 1a and 1b, a retainer according to one embodiment of this invention has been applied to a sprag-type OWC.

FIG. 1b is a cross-sectional view of an OWC 10 taken in an axial direction. The first rotary member, namely, an outer race 1 defines a race surface 1a on the inner peripheral wall thereof. The second rotary member, namely, an inner race 2 is arranged inside the outer race 1 and concentrically with the outer race 1. The outer peripheral wall of the inner race 2 defines a race surface 2a. As a result of this construction, the outer race 1 and inner race 2 are rotatable relative to each other with the race surfaces 1a and 2a opposing to each other.

Within an annular space defined by the outer race 1 and inner race 2, there are arranged at equal angular intervals torque transmitting members for transmitting torques therebetween, namely, sprags 3 in the shape of a peanut shell so that torques are transmitted between the inner and outer races. The sprags 3 are held in place within substantially rectangular openings 8 (see FIGS. 3 and 3a) formed respectively in paired annular retainer members, namely, an inner cage 6 and an outer cage 5. The openings 8 of the outer and inner cages 5,6 are each defined by cross bars 7 and both peripheral edge portions of the cage. A ribbon spring 4 is arranged between the outer and inner cages 5,6 so as to give a raising moment to each sprag 3 in a direction that the outer and inner races 1,2 are brought into engagement via the sprags 3.

The inner cage 6 has an annular flange 6a which extends at a right angle from one axial end of the inner cage 6, namely, inwardly in the radial direction to a predetermined distance. The inner cage 6 is, at the free edge 6c of the flange 6a, in contact with the race surface 2a of the inner race 2.

On the other hand, the outer cage 5 has a peripheral flange 5a which extends at a right angle from one axial end of the outer cage 5, namely, outwardly in the radial direction to a predetermined distance. The free edge of the flange 5a and the race surface 1a of the outer race 1 are in contact with each other, so that a contacting portion 5c is formed. As indicated at the hatched portion in FIGS. 3 and 3a, the contacting portion 5c has a wide area.

In order to form the contacting portion 5c on the outer cage 5, the outer cage 5 is firstly formed in such a way that the contacting portion 5c, where the flange 5a of the outer cage 5 contacts the race surface 1a of the outer race 1, defines substantially a true circle with a predetermined clearance d between the contacting portion 5c and the race surface 1a. This clearance d is provided in order to avoid possible damages to the function of the outer cage 5 as a retainer when the outer cage 5 is machined into an elliptical shape as will be described subsequently.

Figure 1C:
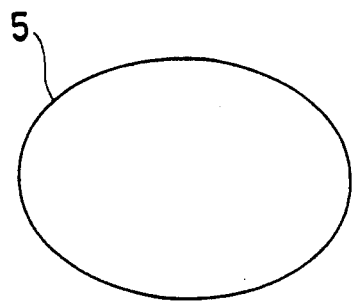
FIG. 1c is a schematic view showing one example of the shape of the retainer.

The outer cage 5 is thereafter machined to have the shape depicted in FIG. 1c. When the resultant elliptical outer cage 5 is fit within the race surface 1a of the outer race 1, the flange 5a of the outer cage 5 forms the contacting portion 5c relative to the race surface 1a at locations which are opposite to each other on the major axis 12 of the resultant ellipse. The contacting portions 5c are always maintained in contact with the race surface 1a, whereby the outer cage 5 shows as a whole the same function as a spring to obtain a certain degree of drag torque.

Figure 1D:
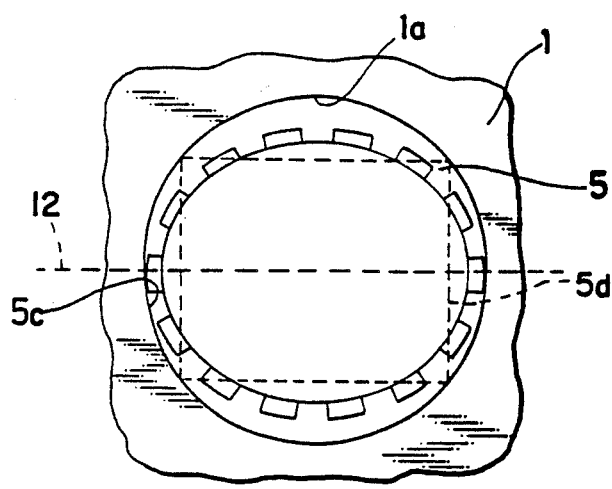
FIG. 1d is a radial simplified cross-sectional view showing the retainer in a state fit in an outer race.

In FIG. 1d, the sprags are omitted for the sake of convenience and the retainer is shown schematically. The elliptical shape depicted in FIGS. 1c and 1d is somewhat exaggerated in order to clarify its description. Needless to say, the ratio of its minor axis to its major axis should actually be a value close to 1 so that free movements of the sprags are not prevented.

Figure 9:
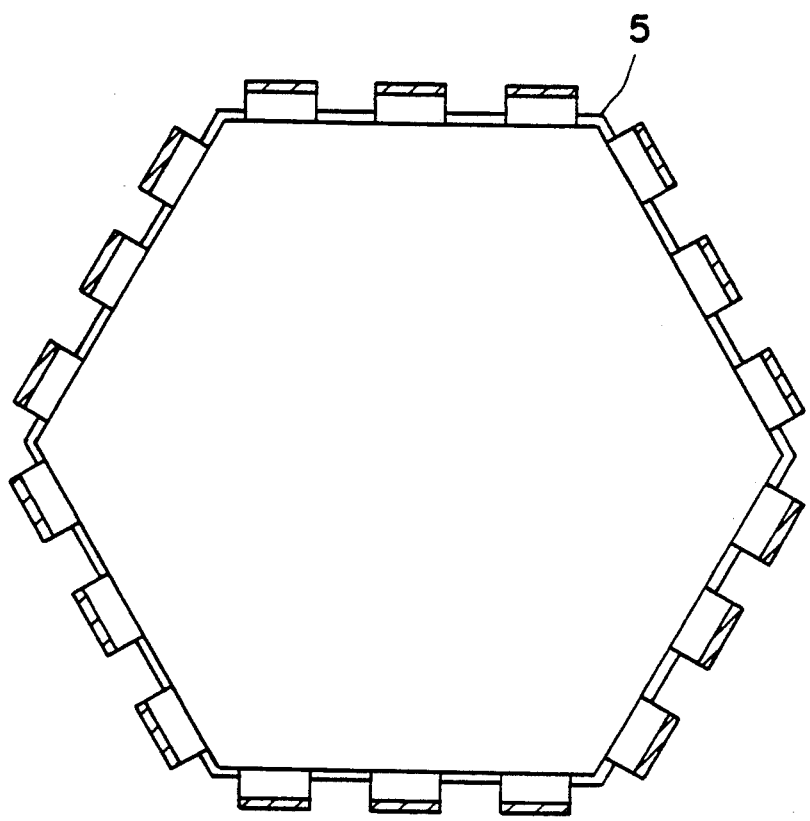
FIG. 9 is a modified cross-sectional view of a modified inner cage of a retainer according to another embodiment.

Each cage may also be provided in an elliptical shape from the beginning. The ratio of the minor axis to the major axis of the elliptical shape can be chosen as desired in accordance with use and installation conditions. In addition, the elliptical shape of each cage may also be changed into a polygonal shape such as triangular or square shape, in which the individual sides are fully expanded outwards in the radial direction. A cage 5d of a square shape is shown by dashed lines in FIG. 1d. Namely, each cage is required merely to have such a shape that it defines a contacting surface, at which the cage is maintained in contact with the associated race surface, at least at a part thereof so as to have a predetermined degree of resilient deformability relative to the diametrical dimension of the associated race. A polygonal retainer is shown in FIG. 9.

In the above described embodiment, the outer cage is rendered in its entirety resiliently deformable into the elliptical shape. Similar effects can still be achieved even when the cylindrical portion of the outer cage is allowed to remain as a true circle as viewed in cross-section and the outer peripheral portion of the flange is machined into an elliptical shape or the like. It has been described to provide a contacting portion on the outer cage only. It is also possible to machine the inner cage into a similar shape so that the inner cage is maintained in contact with the inner race 2 to obtain a drag torque between the inner cage and the inner race 2. In this case, when machined into an elliptical shape by way of example as shown in FIG. 6, the contacting portions with the inner race 2 are obtained on the minor axis 11. Further, both outer and inner cages can be formed into the above-described shape.

The required degree of drag torque is determined by the contacting area between a race surface and its associated retainer and the degree of resilient deformability and the shape of the retainer. A desired degree of drag torque can therefore be chosen in accordance with use conditions.

Figure 2:
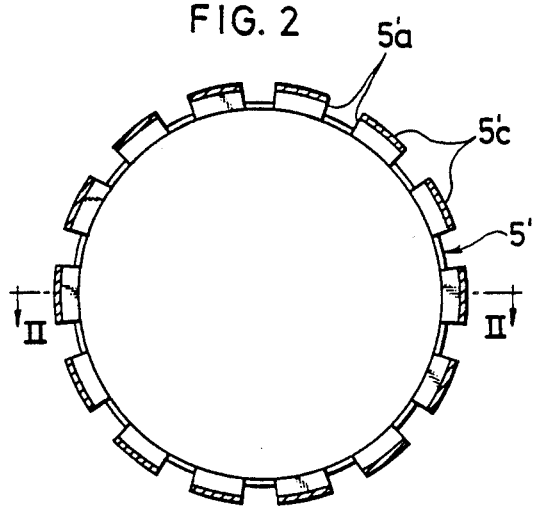
FIG. 2 is a radial cross-sectional view of a modified outer cage of a modified retainer according to a second embodiment.
Figure 2A:
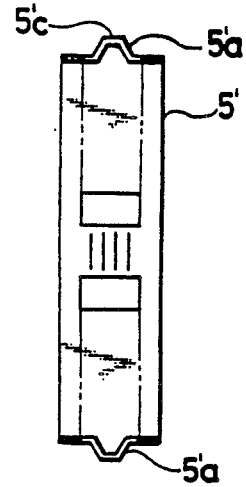
FIG. 2a is a cross-sectional view of FIG. 2 taken in the direction of arrows II.
Figure 3:
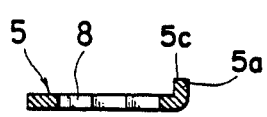
Figure 3A:
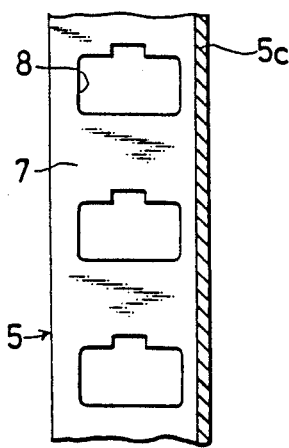
FIG. 3a is a fragmentary plan view of the outer cage of FIG. 3.

FIGS. 2, 2a, 5 and 5a illustrate a modified outer cage 5' having, in place of the peripheral flange 5a of FIGS. 3 and 3a, an annular raised portion 5'a which is disposed along the circumferential center line of the modified outer cage 5'. The modified outer cage 5', like the outer cage 5 of FIGS. 3 and 3a, has a plurality of substantially rectangular openings 8 arranged at equal angular intervals, each of the rectangular openings 8 extending across the annular raised portion 5'a transversely, namely, in a direction parallel to the axis of the modified outer cage 5'.

Figure 5:
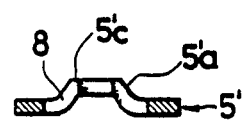

The annular raised portion 5'a, as shown in FIGS. 2, 2a and 5, projects radially outwardly from the modified outer cage 5' to a predetermined extent to define by its outermost part an outer contacting portion 5'c of an adequately wide area engageable with the inner surface 1a of the outer race 1.

Figure 8:
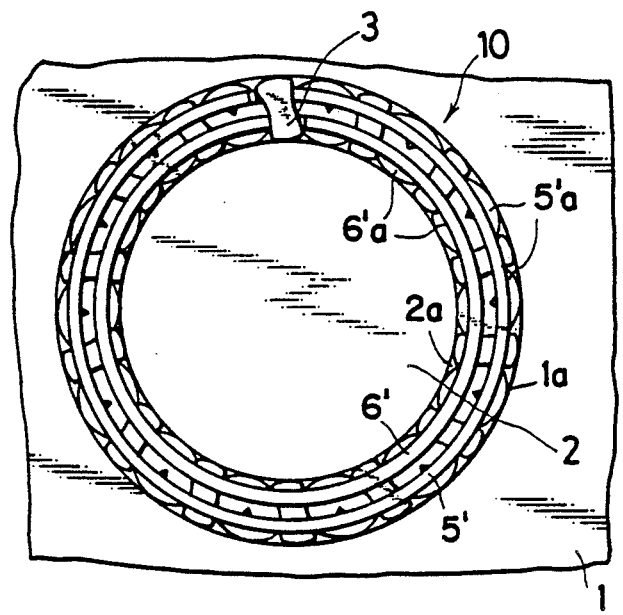
FIG. 8 is a front elevational view of a retainer according to another embodiment.
Figure 7:
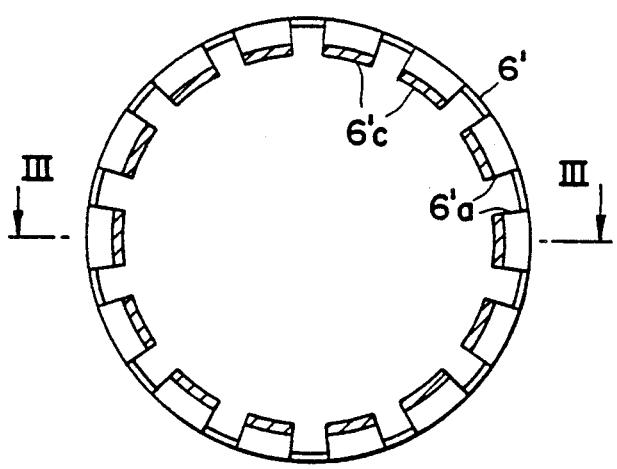
FIG. 7 is a modified cross-sectional view of a modified inner cage of a retainer according to a second embodiment.
Figure 7A:
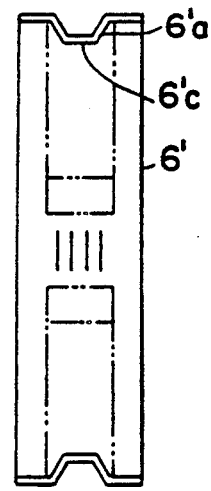
FIG. 7a is an axial cross-sectional view of FIG. 7 taken in the direction of arrows III—III.

The modified outer cage 5' cooperates with a companion modified inner cage (6') having an annular raised portion (6'a) similar to the annular raised portion 5'a. The annular raised portion (6'a), in contrast to the annular raised portion 5'a, projects radially inwardly from the modified inner cage (6') to define by its innermost part an inner contacting portion (6'c) engageable with the outer surface 2a of the inner race 2, as shown in FIGS. 7, 7a, and 8.

Thus the annular raised portions 5'a, (6'a) of the modified outer and inner cages 5', (6') serve as equivalents to the respective flanges 5a, 6a of the outer and inner cages 5, 6 of FIGS. 3 and 3a with substantially the same results.

Figure 1E:
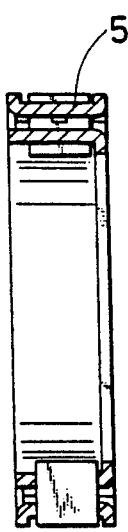
FIG. 1e is a view similar to FIG. 1a, showing a conventional retainer.
Figure 4:
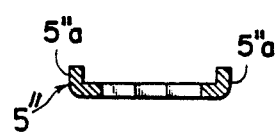
FIG. 4 is a fragmentary cross-sectional view of a conventional outer cage of the retainer of FIG. 1e.
Figure 4A:
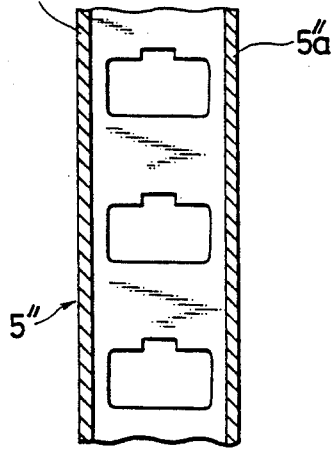
FIG. 4a is a fragmentary plan view of the conventional outer cage of FIG. 4.
Figure 5A:
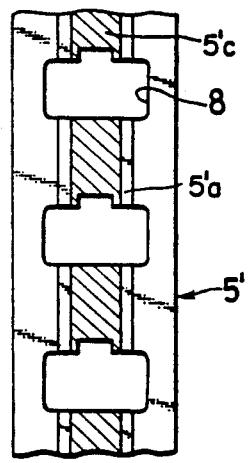
FIG. 5a is a fragmentary plan view of the modified outer cage of FIG. 5.

Although both the outer cage 5' and inner cage (6') are used in the illustrated embodiment, similar effects may also be brought about from the use of either one of these cages as shown, for example, in U.S. Pat. No. 2,824,635 issued Feb. 25, 1958 to H. P. Troendly et al. and U.S. Pat. No. 4,114,739 issued Sept. 19, 1978 to J. Colonna et al. It is also possible to use either one of these cages in combination with a conventional retainer similar to that depicted in FIGS. 1e, 4 and 4a. This combined use can also achieve similar effects in some instances.

Having now fully described the invention, it will be apparent to one of ordinary skill in the art that many changes and modifications can be made thereto without departing from the spirit or scope of the invention as set forth herein.

What is claimed is:

1. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members; and
wherein the specific shape of said annular retainer is substantially elliptical.

2. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members; and
wherein the specific shape of said annular retainer is substantially polygonal.

3. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary member;
wherein said annular retainer comprises a first retainer member disposed adjacent to the first rotary member and a second retainer member disposed adjacent to the second rotary member;
wherein said annular raised portion extends radially outwardly from said first retainer member so as to define said contact portion by its outermost part, and wherein said first retainer member has such a specific shape that said annular raised portion is resiliently deformable in its entirety against the surface of the first rotary member so as to maintain said contact portion in contact with the surface of the first rotary member; and
wherein the specific shape of said first retainer member is substantially elliptical.

4. The annular retainer according to claim 3, wherein said first retainer member is in contact with the first rotary member on the major axis of an ellipse formed by the contact portion of said annular raised portion.

5. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members;

wherein said annular retainer comprises a first retainer member disposed adjacent to the first rotary member and a second retainer member disposed adjacent to the second rotary member;

wherein said annular raised portion extends radially inwardly from said second retainer member so as to define said contact portion by its innermost part, and wherein said second retainer member has such a specific shape that said annular raised portion is resiliently deformable in its entirety against the surface of the second rotary member so as to maintain said contact portion in contact with the surface of the second rotary member; and wherein the specific shape of said second retainer member is substantially elliptical.

6. The annular retainer according to claim 5, wherein said second retainer member is in contact with the second rotary member on the minor axis of an ellipse formed by the contact portion of said annular raised portion.

7. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members;

wherein said annular retainer comprises a first retainer member disposed adjacent the first rotary member and a second retainer member disposed adjacent the second rotary member; and wherein the specific shape of said first retainer member is substantially elliptical.

8. The annular retainer according to claim 7, wherein said first retainer member is in contact with the first rotary member on the major axis of an ellipse formed by the contact portion of said annular raised portion.

9. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members;

wherein said annular retainer comprises a first retainer member disposed adjacent the first rotary member and a second retainer member disposed adjacent the second rotary member; and wherein the specific shape of said second retainer member is substantially elliptical.

10. The annular retainer according to claim 9, wherein said second retainer member is in contact with the second rotary member on the minor axis of an ellipse formed by the contact portion of said annular raised portion.

11. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members;

wherein said annular retainer comprises a first retainer member disposed adjacent to the first rotary member and a second retainer member disposed adjacent to the second rotary member;

wherein said annular raised portion of said first retainer member extends radially outwardly therefrom so as to define said contact portion by its outermost part, and wherein said first retainer member has such a specific shape that said annular raised portion is resiliently deformable in its entirety against the surface of the first rotary member so as to maintain said contact portion in contact with the surface of the first rotary member; and wherein said annular raised portion of said second retainer member extends radially inwardly therefrom so as to define said contact portion by its innermost part, and wherein said second retainer member has such a specific shape that said annular raised portion is resiliently deformable in its entirety against the surface of the second rotary member so as to maintain said contact portion in contact with the surface of the second rotary member; and wherein the specific shape of said first retainer member is substantially elliptical.

12. In an annular retainer for a one-way clutch composed of first and second rotary members arranged in a radially spaced relation, rotatably relative to each other and concentrically with each other and having axially-extending annular surfaces respectively, and torque transmitting members arranged between the first and second rotary members for transmitting torques between the annular surfaces, said annular retainer being adapted to hold the torque transmitting members at equal angular intervals, the improvement wherein said annular retainer has such a specific shape that said retainer is resiliently deformable in its entirety against the annular surface of at least one of the first and second rotary members so as to maintain at least a part of said retainer in contact with the annular surface of said at least one of the first and second rotary members, wherein said annular retainer is in the form of at least one cylinder having an annular raised portion along the circumferential center line of said cylinder, said annular raised portion projecting from said cylinder so as to define a contact portion contacting the annular surface of said at least one of the first and second rotary members;

wherein said annular retainer comprises a first retainer member disposed adjacent to the first rotary member and a second retainer member disposed adjacent to the second rotary member;

wherein said annular raised portion of said first retainer member extends radially outwardly therefrom so as to define said contact portion by its outermost part, and wherein said first retainer member has such a specific shape that said annular raised portion is resiliently deformable in its entirety against the surface of the first rotary member so as to maintain said contact portion in contact with the surface of the first rotary member; and wherein said annular raised portion of said second retainer member extends radially inwardly therefrom so as to define said contact portion by its innermost part, and wherein said second retainer member has such a specific shape that said annular raised portion ;is resiliently deformable in its entirety against the surface of the second rotary member so as to maintain said contact portion in contact with the surface of the second rotary member; and wherein the specific shape of said second retainer member is substantially elliptical.

13. The annular retainer according to claim 12, wherein the specific shape of said first retainer and said second retainer is substantially elliptical.

* * * * *